United States Patent [19]

Besancenot

[11] 4,008,953
[45] Feb. 22, 1977

[54] PROJECTOR CONTROL MECHANISM
[76] Inventor: Serge Besancenot, 20, Avenue de Livry, 93270 Sevran, France
[22] Filed: Oct. 22, 1975
[21] Appl. No.: 624,828
[30] Foreign Application Priority Data
Oct. 21, 1974 France .............................. 74.35249
[52] U.S. Cl. ................................ 353/103; 74/384; 74/405; 353/106
[51] Int. Cl.² .................. G03B 23/02; F16H 35/00; F16H 57/00
[58] Field of Search ................. 353/106, 107, 103; 274/1 L; 74/384, 405, 406

[56] References Cited
UNITED STATES PATENTS
3,220,735  11/1965  Beugin .................. 274/9 A FOREIGN PATENTS OR APPLICATIONS
1,048,078  11/1962  United Kingdom .............. 353/106

Primary Examiner—Steven L. Stephan

[57] ABSTRACT

A control mechanism for controlling the reciprocating movement of a pusher for a picture-holder in a transparency projector of the type in which a rotating shaft serves to reciprocate the pusher during the course of a 360° rotation of the shaft. A continuously rotating electric motor drives the shaft through two gear stages and a coupling member effects the coupling of the motor to the shaft first, through the first stage and then through the second stage.

5 Claims, 3 Drawing Figures

PROJECTOR CONTROL MECHANISM

The present invention relates to a control mechanism for the picture holder of a transparency projector.

Although the systems currently in use generally operate satisfactorily, they still have a few disadvantages from the point of view of smoothness of operation, and owing to the fact that sometimes the elements of a reduction mechanism, which in general consists of gear couples, which causes the blocking of the device are in danger of being found in the non-engaged position as they all come into operation at the same time.

According to the present invention, there is provided a control mechanism for controlling the reciprocating movement of a pusher for a picture-holder in a transparency projector of the type which includes a rotating shaft for driving the pusher to-and-fro, a rotation of 360° of the shaft corresponding to a complete to-and-fro movement of the pusher, and a continuously rotating electric motor, said mechanism comprising two stages of gears for coupling the motor to the shaft, and a control member for initiating the coupling of the motor to the shaft, whereby operation of the control member firstly causes a first of said stages to be engaged, and then a second of said stages to be engaged after engagement of the first stage, thereby to complete the coupling of the shaft to the motor.

Preferably, a wheel forming the last element driven by the two stages of gears is mounted on the shaft for driving the pusher to-and-fro, said wheel being provided on its periphery with a vertical lip inside which a stud carried by the pivoting arm is trapped when the arm pivots under the attraction of the electromagnet, this stud being freed through a notch formed in this lip after a 360° rotation of the wheel corresponding to a return journey of the pusher under the action of the return spring of the electromagnet which is no longer excited, the elements of the mechanism thus being separated from each other.

For more certain operation of the return of the stud after a rotation, the stud may be lead to the window by an elastic abutment situated under the control wheel.

The invention will now be described in more detail, by way of example only with reference to the accompanying drawing, in which.

Figure 2:
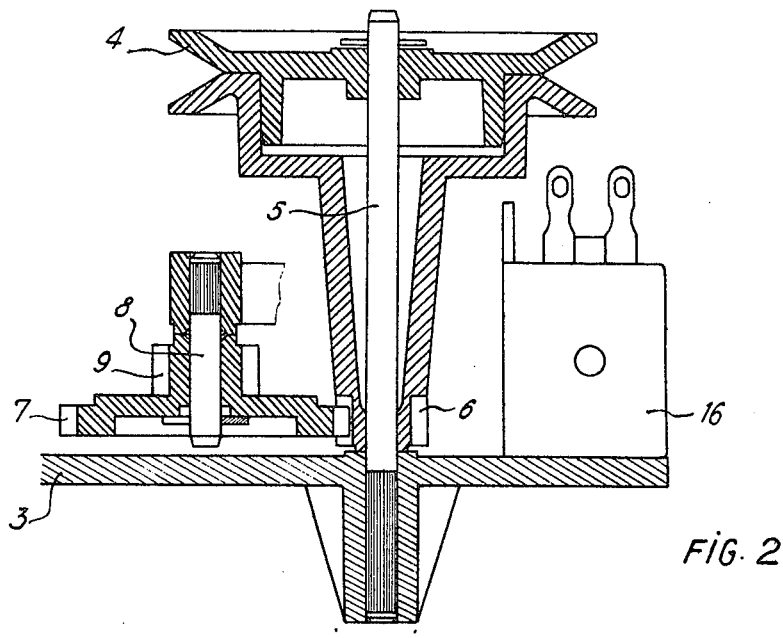
FIGS. 2 and 3 show respectively sections along the lines II—II and III—III of FIG. 1.

Referring to the figures, a pusher generally designated by 1, which is known in itself, is controlled by the rotation of a shaft 2 pivotally mounted vertically in frame 3 of the projection lamp.

The control of the reciprocating motion of the pusher 1 is carried out for each successive picture by a rotation of 360° of the shaft 2 provided by a continuously rotating motor (not shown) which is engaged via a transmission belt acting on a pulley 4 pivoting freely on a shaft 5.

The pulley 4 is integral with a pinion 6 of a first stage comprising pinion 6 and a toothed wheel 7 pivotally mounted on a shaft 8.

The wheel 7 is integral in rotation with a pinion 9 which constitutes a first element of the second stage of the reduction mechanism, the second element of this second stage being a toothed wheel 10 mounted on shaft 2 and rotating with it. This wheel is in fact the control wheel of the rotation of the shaft 2.

Figure 1:
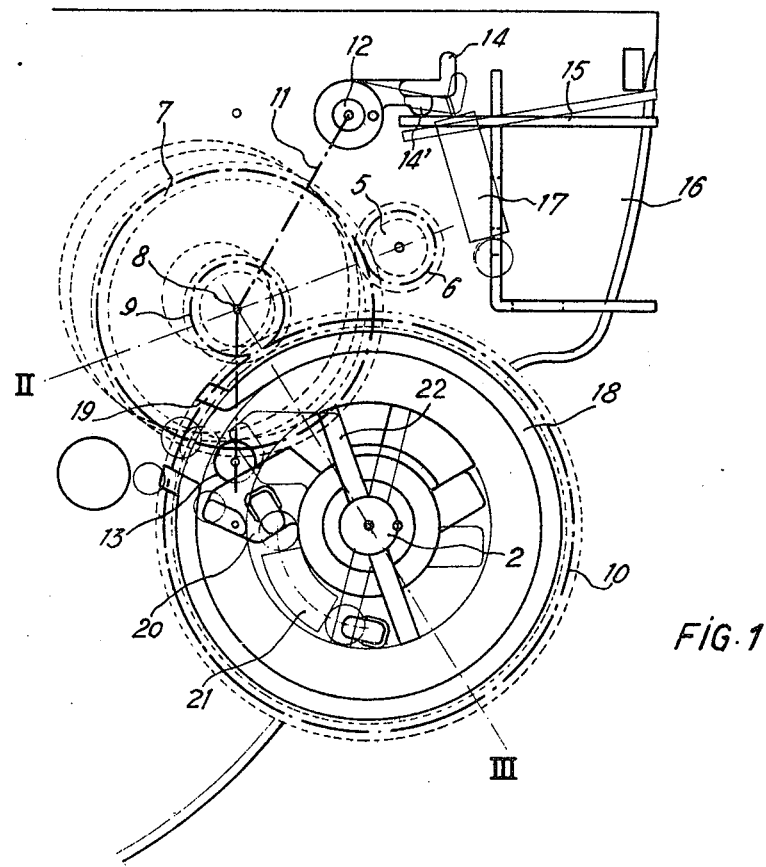
FIG. 1 is a diagrammatic view from above showing the mechanical elements of a reduction mechanism and clutch, the continuous lines showing the position of the elements when they are in the course of being engaged, i.e., during the passage of a picture, while broken lines show their position when disengaged.
Figure 3:
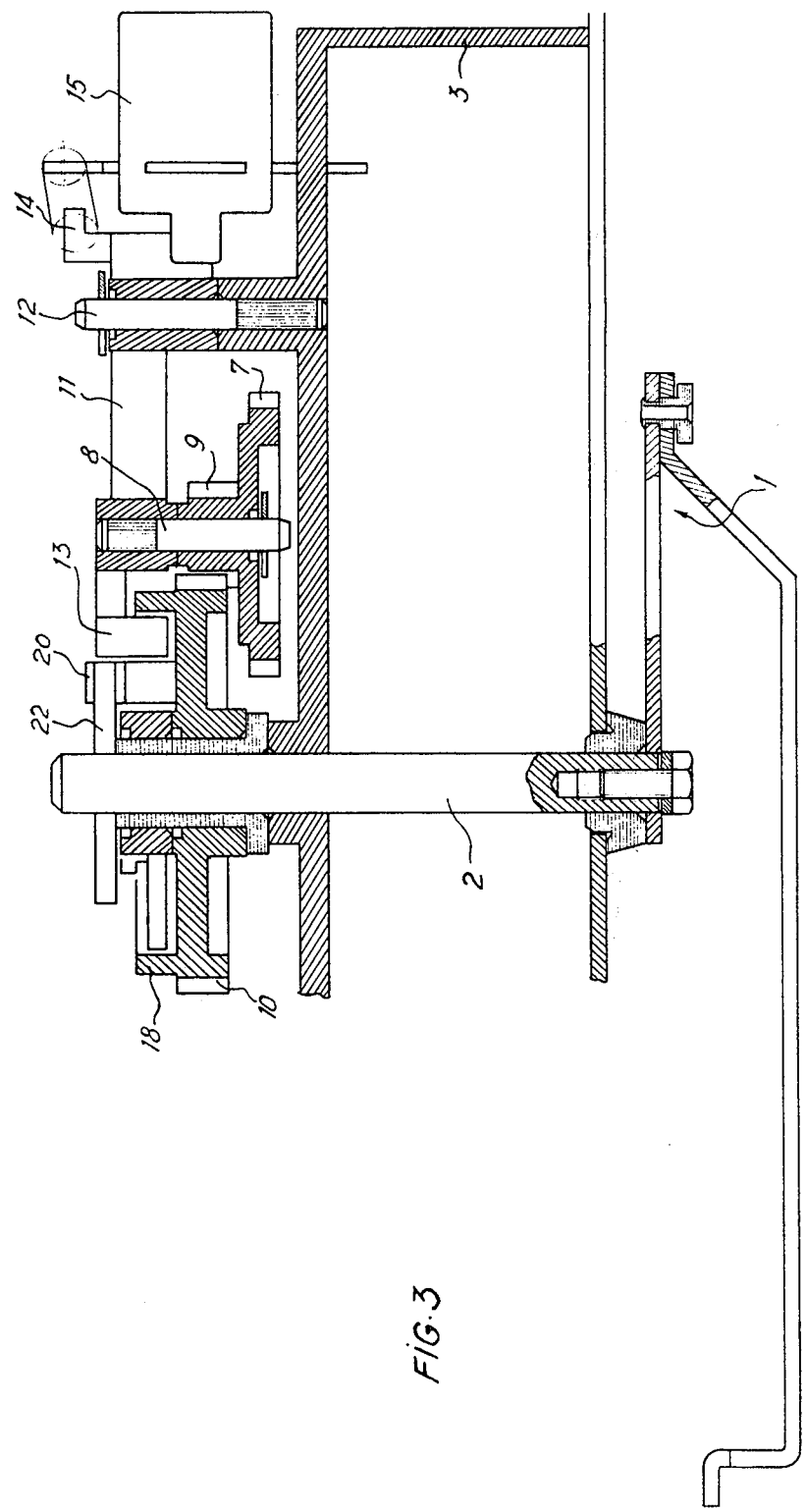

The shaft 8 of the wheel 7 and the pinion 9 is mounted on an arm 11 (FIGS. 1 and 3), pivotal about a vertical shaft 12 one end of which carries a stud 13 (FIGS. 1 and 3). The other end 14, as can be seen in FIG. 1, cooperates through a finger 14' with the armature 15 of an electromagnet 16, biased by a spring 17 into the position which, by a pivoting motion about the shaft 12, separates the wheel 7 from the pinion 6 and the wheel 9 from the wheel 10.

The toothed wheel 10 has on the periphery of its upper edge a lip 18 (see FIGS. 1 and 3), extending over all its circumference with the exception of a window 19. The operation of the device will now be described:

When no picture is passing into the projector, the motor is continously rotating and the assembly of the elements is in the position shown in broken lines in FIG. 1. When the operator wants to cause the projection of a picture, he presses a control button which produces a pulse of electric current which excites the electromagnet for a few seconds.

At this moment the armature is attracted by the electromagnet 16 and it causes, by exerting a force on the stud 14', the pivoting of the arm 11 about its shaft 12 so that the wheel 7 engages the pinion 6 which causes the rotation of the pinion 9 which is still in the free state.

The pivoting of the arm 11 continues and the pinion 9 then engages the toothed wheel 10 which determines the start of the rotation of this wheel. At the same time, the stud 13 penetrates in the interior of the lip 18 carried on the wheel 10 and is trapped inside this lip throughout the 360° rotation of the wheel, i.e., during the to-and-fro movement of the pusher.

Once the wheel 10 has completed this 360° rotation, the stud 13 again faces the window 19, but due to the fact that the electromagnet is no longer excited and therefore the arm 11 is attracted by the spring 17 in the clockwise direction, the stud 13 will tend to leave the lip 18 via the window 19.

At this moment, the two stages of the reduction mechanism are disengaged by the pivoting of the arm 11 and the assembly of the elements of the system will again take up the inactive position shown in dotted lines.

To ensure this dis-engagement of the stud 13, an abutment 20 which is mounted in opposition with a return spring 21 is provided inside the lip 18. The abutment 20 can move up to a stop 22, the position in which the stud 13, being supported against this abutment 20, is exactly opposite the window 19.

It is therefore clear that owing to the action of the single electric pulse exciting the electromagnet 16, the operator has caused the successive entry into operation of the two stages of the reduction mechanism, then the trapping of the stud 13 inside the lip 18, i.e., the holding in the active position of the reducer throughout the 360° rotation of the wheel 10 and finally the dis-engagement of the stud through the window 19, i.e., the dis-engagement of all the elements of the reduction mechanism and the returning of the system to the waiting position.

More than two reduction stages may be provided, or a different system may be used for holding the stud in the position where it makes the arm ensure the engagement of the reducer throughout 360° of rotation of the axis controlling the pusher 1.

What I claim is:

1. A control mechanism for controlling the reciprocating movement of a pusher for a picture-holder in a transparency projector of the type which includes a rotating shaft for driving the pusher to-and-fro, a rotation of 360° of the shaft corresponding to a complete to-and-fro movement of the pusher, and a continuously rotating electric motor, said mechanism comprising two stages of gears for coupling the motor to the shaft, and a control member for initiating the coupling of the motor to the shaft, whereby operation of the control member firstly causes a first of said stages to be engaged, and then a second of said stages to be engaged after engagement of the first stage thereby to complete the coupling of the shaft to the motor, said control member comprising a pivotal arm, a shaft carried by said arm, said first stage comprising a first pinion, said second stage comprising a first toothed wheel, said control member further comprising a second pinion and a second toothed wheel secured together and mounted on said shaft in an arrangement such that upon pivoting of said arm the second toothed wheel engages said first pinion whereafter further pivoting of said arm causes the second pinion to engage said first toothed wheel.

2. A mechanism as claimed in claim 1 comprising means on said arm for holding said second pinion in engagement with said first toothed wheel for 360° of rotation of said shaft.

3. A mechanism as claimed in claim 1, wherein the control member further comprises an electromagnet, the excitation of which causes the pivoting of said arm against the action of a return spring.

4. A mechanism as claimed in claim 3 comprising a wheel forming the last element driven by the two stages of gears is mounted on the shaft, for driving the pusher to-and-fro, said wheel being provided on its periphery with a vertical lip inside which a stud carried by the pivoting arm is trapped when the arm pivots under the attraction of the electromagnet, said stud being freed through a notch formed in the lip after a 360° rotation of the wheel corresponding to a return journey of the pusher under the action of the return spring of the electromagnet which is no longer excited, the elements of the mechanism thus being separated from each other.

5. A mechanism as claimed in claim 4 comprising an elastic abutment situated on said wheel to eject the stud through the window at the end of a 360° rotation.

* * * * *